United States Patent [19]
Palmer

[11] 3,838,457

[45] Sept. 24, 1974

[54] TRACK SEEKING AND FOLLOWING SERVO SYSTEM

[75] Inventor: Ronald S. Palmer, San Jose, Calif.

[73] Assignee: International Business Machines Corporation, Armonk, N.Y.

[22] Filed: July 5, 1973

[21] Appl. No.: 376,775

[52] U.S. Cl. .................................................. 360/78
[51] Int. Cl. .................................................. G11b 5/48
[58] Field of Search .................................................. 360/77, 78

[56] References Cited

UNITED STATES PATENTS

| | | | |
|---|---|---|---|
| 3,491,347 | 1/1970 | Farrand | 340/174.1 C |
| 3,691,543 | 9/1972 | Mueller | 340/174.1 C |
| 3,696,354 | 10/1972 | Palombo et al. | 340/174.1 C |

*Primary Examiner*—Vincent P. Canney
*Attorney, Agent, or Firm*—Charles E. Rohrer

[57] ABSTRACT

In a magnetic disk recording device, a track following system for detecting servo signals to distinguish one track from another within a repeating group of tracks and to add a biasing signal to said detected signal whenever the transducing head is located more than one-half track from the target track. Means for producing a position error signal of linear slope over the group number of tracks is disclosed enabling the electrical offsetting of the transducing head up to one-half the group number of tracks by modifying the position error signal. Seeking means are provided to rapidly move the transducing head toward the target track from a position more than plus or minus one-half the group number of tracks and means are provided for counting the group number and the track number within the group.

6 Claims, 18 Drawing Figures

TYPICAL DECODER OUTPUTS

| INTERVAL NO. | DECODER OUTPUT FOR SERVO BETWEEN TRACKS 1 & 2 | | | DECODER OUTPUT (SERVOING BETWEEN TRACKS 3 & 4) | | |
|---|---|---|---|---|---|---|
| | TRACK NO. | GATES ACTIVATED | PK. DET. ACTIVATED | TRACK NO. | GATES ACTIVATED | PK. DET. ACTIVATED |
| 0 | | NONE | | | NONE | |
| 1 | 6 | B & C | 249 | 6 | F & D | 248 |
| 2 | 4 | F & D | 248 | 4 | D | 248 |
| 3 | 2 | D | 248 | 2 | B & C | 249 |
| 4 | 5 | A & C | 249 | 5 | E & D | 248 |
| 5 | 3 | E & D | 248 | 3 | C | 249 |
| 6 | 1 | C | 249 | 1 | A & C | 249 |

TRACK SEEKING AND FOLLOWING SERVO SYSTEM

This invention relates to a track seeking and following servo mechanism and more particularly to a servo system in which the position error signal may be sensed several tracks from the target track.

RELATED PATENTS

Several patents have been issued to the assignee of the present invention which provide background information. They are:

U.S. Pat. No. 3,219,353 to Prentky;
U.S. Pat. No. 3,404,392 to Sordello;
U.S. Pat. No. 3,427,606 to Black and Sordello;
U.S. Pat. No. 3,534,344 to Santana;
U.S. Pat. No. 3,614,756 to McIntosh and Padalino; and
U.S. Pat. No. 3,691,543 to Mueller.

BACKGROUND OF THE INVENTION

Many data processing computer systems make use of auxiliary storage devices to augment the amount of memory storage available in the computer's main memory. Data stored in auxiliary storage is read into main memory when needed, operated upon by the computer and written onto the auxiliary storage device when finished.

The most common type of auxiliary storage device is the magnetic recorder which includes the magnetic disk device where data is stored on continuous concentric tracks located on disk surfaces. An example of such a device in current use is the IBM 3330 Direct Access Disk Device which utilizes a disk pack comprising ten disks, 20 disk surfaces with 411 continuous concentric tracks on each disk surface. The mechanisms and the circuits which are used in this device can be viewed in the document IBM Maintenance Library, ID 3330301.

Data (information) located on a particular track on a disk surface is read by properly positioning a transducer (read/write head) directly over the track. In order to maintain the head in proper position over the data track, track following servo systems are incorporated into disk devices. These systems receive their positioning information from special servo signals built into the disk along the data track with which registration is to be maintained. The systems normally have used two types of servo data, one signal produced from one side of the data track with a second signal produced from the other side; these signals being combined and/or compared in appropriate circuits to determine any error that might be present in the registration of head to track center line. The types of servo signals variously used have included flux transitions described in the patents to Santana and Mueller, phase discrimination described in the patent to Black and Sordello, and dual frequency systems such as described in the patent to Sordello. Servo signals have been arranged in continuous fashion throughout the extent of a continuous servo track and they have been arranged on intervals along a track. The servo signals have been interspersed with data on the data track itself and they have been placed in dual layer disks directly beneath the data track.

Whatever the type of servo system used and whatever the configuration of the servo signals on the disk, the width of the position error signal in the prior art is no more than one-half track from the center line of the target track; that is, should the transducing head stray more than one-half track away from the center line, the correct position error signal is lost and the transducing head comes under the influence of the position error signal on the adjacent data track and hence, would attempt to lock in on the adjacent track. This problem seldom occurs in a properly designed and in a properly working prior art servo system once the head is actively following the track. However, the problem may sometimes occur when the head is being moved in a radial direction toward or away from the spindle; that is, when it is being moved from one track to a target track. Most disk devices utilize a seeking mechanism that rapidly moves the head toward its target track and the track following servo mechanism is allowed to control movement of the head only when the head is moved to within plus or minus one-half track of the target. Should inertial force from the seeking mechanism carry the head beyond one-half track from the center line of the target track, the track following servo would attempt to lock on the wrong track. Thus, it may be necessary to provide for re-energizing the seek mechanism to once again move the head toward the target and try again to home in accurately. This problem has recently become much more severe than previously because of the desire to concentrate tracks with a greater and greater density on the disk surface; that is, to narrow the track width and abut the sides of the tracks directly along each other. As an illustration, track widths are now arriving at a dimension considerably less wide than the normal thickness of a sheet of writing paper. It is an object of this invention to provide means for extending the position error signal out over several tracks from the target track thus enabling the track following servo system to home in on the target track from several tracks away.

Many disk devices in use at the present time utilize a separate servo head from the data read/write head and separate servo tracks from the data tracks. In such a device, the servo head and the data head are mechanically connected in rigid relationship so that when the servo head positions the read/ write head on a certain track, it is always positioned in exactly the same place. A problem occurs, however, when the data is written on the track by one device and then the disk is physically removed and stored or sent to another location and eventually mounted on another device. The mechanical relationship between the read head and the servo head on the second device may not be exactly the same as it was on the first device with the consequence that the reading head would not be in exact registration with the track. In such a situation, it is necessary to electrically offset the servo head in order to bring the read/write head into exact registration with the data track. However, as mentioned above, in prior art devices the position error signal is definitive for track following only within plus or minus one-half track of the center line of the data track. Consequently, it is not possible to offset the servo head more than one-half track without losing the correct position error signal. This problem is made much more severe by the desire to increase track density since a very small tilt or mechanical variation in the rigid mechanical connection between servo head and read/write head from device to device can throw the heads into serious misalignment.

Therefore, it is an object of this invention to alleviate these problems by providing a position error signal over several tracks so that electrical offsetting may occur over several track widths from the target track.

A requirement of all devices is that the seeking mechanism keep count of how many tracks it has crossed when moving the transducing head in a radial direction from a former location toward the target track. The problem of losing accurate track count is made much more severe by high track densities and by the desire to move the head at faster and faster velocities during the seeking operation. If the head should pass over a track without receiving a signal from it, then the count of tracks moved would be off. The problem is most severe in arrangements where the servo signals are interspersed with data on the data track. Therefore, it is another object of this invention that means be provided to locate tracks within groups so that the seeking mechanism knows generally where it is at all times and can slow down at a proper time for exact track reckoning prior to homing in on the target track and passing control to the track following servo mechanism.

SUMMARY OF THE INVENTION

This invention involves the incorporation of special servo data in the magnetic recording medium such that, by sensing the special data, knowledge of the location of the head may be generated within a group of tracks. Biasing means are provided to extend the position error signal over plus or minus one-half the group number of tracks and aid in the continued movement of the head toward the target track. Electrical offsetting signals may be provided to modify the bias in order to position the servo head within plus or minus one-half the group number of tracks.

BRIEF DESCRIPTION OF THE DRAWINGS

The foregoing and other objects, features and advantages of the invention will be apparent from the following detailed description of a preferred embodiment of the invention as illustrated in the accompanying drawings wherein.

GENERAL DESCRIPTION OF ILLUSTRATIVE ENVIRONMENTS

Figure 1:
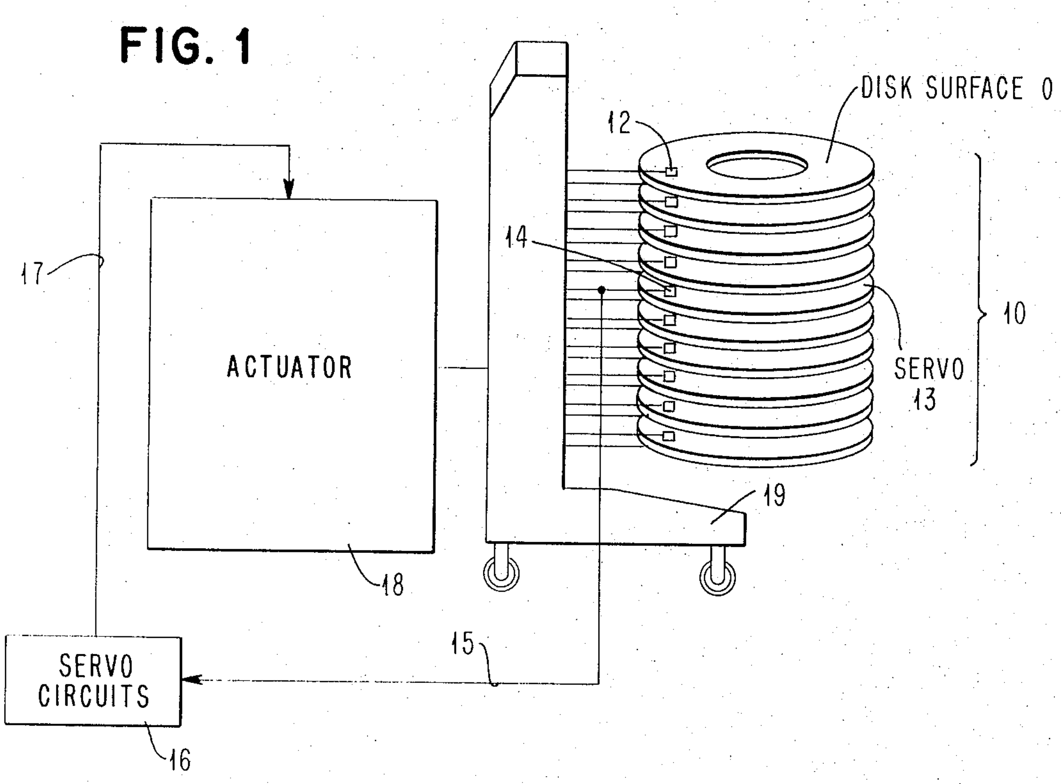
FIG. 1 shows a typical disk pack.

FIG. 1 shows a typical direct access disk device comprising a disk pack 10 containing ten disks or 20 disk surfaces. A transducing data head (read/write head) 12 is shown positioned on disk surface 0 with other transducing heads shown for each of the disk surfaces. Note that disk surface 13 is marked as comprising servo data; that is, in this illustration, all of the servo track information is located on that particular disk surface and is read by transducing head 14. Thus, head 12 and all other read/write heads on the disk pack are positioned by the servo data picked up by servo head 14. Servo data is sent to the servo circuit 16 over line 15. The output of the servo circuits is sent over line 17 to the actuator 18 which moves the heads in synchronism in a radial direction in order to position the heads in exact registration with the tracks to be followed. Similarly, when seeking a new target track, the actuator will be energized to move the carriage 19 toward the target track.

Figure 2:
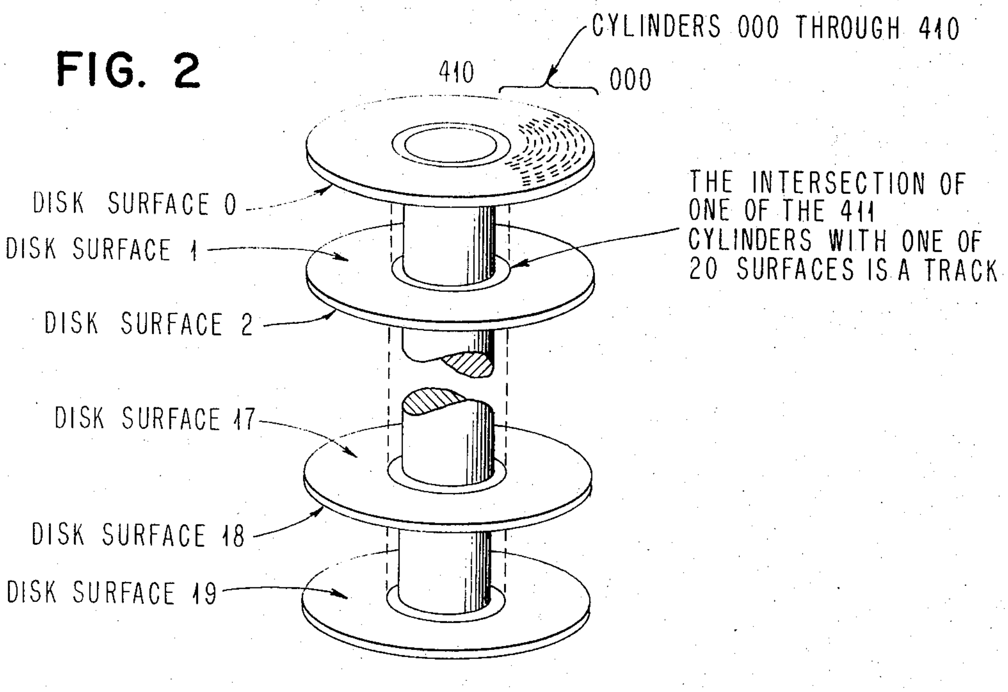
FIG. 2 illustrates the definition of tracks and cylinders on a disk pack.

FIG. 2 is a representation of a disk pack such as would be used in the IBM 3330. These disk packs include 411 tracks across a disk surface from the outer track to the inner track. FIG. 1 illustrates that when the head 12 is positioned on track 0 of disk surface 0, all of the other heads are also positioned at track 0 of their respective disk surfaces. As a result, there is provided a cylinder of tracks, 20 in number, all accessible without carriage movement. These 20 tracks are termed cylinder 0 and each of the tracks is given a different number; that is, the first track on disk surface 0 will be track 0 and the last track on the bottom disk will be track 19. Thus, as the carriage is moved in toward the spindle in a radial direction, each head crosses 411 tracks and therefore the device accesses 410 cylinders of 20 tracks each.

Figure 3:
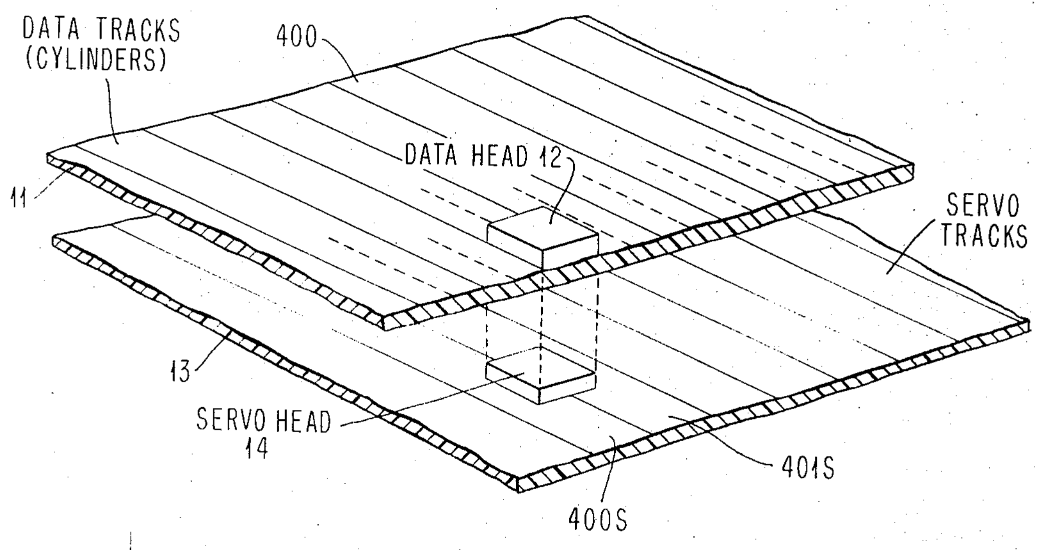
FIG. 3 shows a sample relationship of data tracks and data heads to servo tracks and servo heads.

FIG. 3 is a broken-away view showing data tracks (cylinders) across a disk surface 11 with the data head 12 positioned on data track (cylinder) 400. Note that the sides of the servo tracks abut each other at the center line of the corresponding data track; thus equal signals from each of the two servo tracks are available to position the servo head on the center line of the data track and since the data head is maintained in rigid mechanical relation to the servo head, it too will be in exact registration with the data track. Should the servo head 14 move slightly in one direction or the other, one of the servo signals will increase and the other will decrease creating an imbalance which will cause the actuator to move. This brings the servo head back into proper alignment with the servo tracks and, in so doing, the data head is kept directly over the track it follows.

Figure 4:
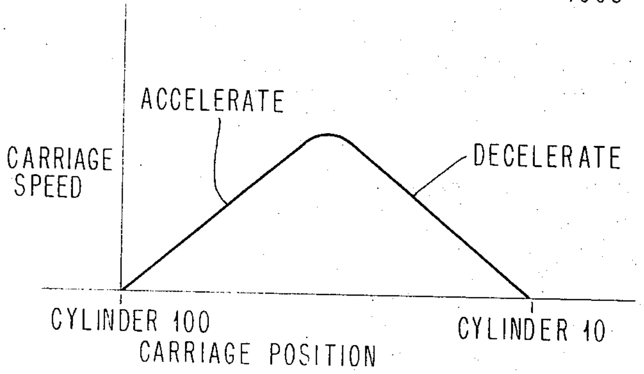
FIG. 4 is a chart of typical carriage speed during a seeking operation.

FIG. 4 is a graph showing the carriage speed when it is moved from cylinder 100 to cylinder 10. Note that the rates of acceleration and deceleration are equal so that maximum speed is attained at a carriage position approximately half-way between the two cylinders. Obviously, the rates of acceleration and deceleration could be different; the object is move the carriage as fast as possible toward the target cylinder with deceleration to a proper low speed as the carriage approaches the target cylinder so that it will not overshoot the target.

The arrangement of all of the servo data on one particular disk as shown in FIGS. 1 and 3 is a common arrangement in many disk devices in current use. However, many alternatives are possible such as, for example, a dual layer disk in which the servo information is located on the same disk as the work data but in a separate recording layer. The dual layer disk has the obvious advantage of enabling a single head to read both the work data and the servo data and thus eliminate the mechanical problems of head misalignment due to tilt or temperature variations or manufacturing tolerances. Unfortunately, the dual layer disk has not been perfected to the extent where it has seen widespread use outside the laboratory.

Another arrangement of servo data may be in special tracks on each disk surface so that the data head would access work data, for example, on tracks 0 through 200 while tracks 200 through 400 would contain servo data and would be read by a servo head. The two heads would obviously be mechanically connected to each other and while problems of tilt would be eliminated in such an arrangement, problems of manufacturing tolerances from device to device would remain together with problems of temperature variations. Also, much track space would be used for servo data.

Figure 5:
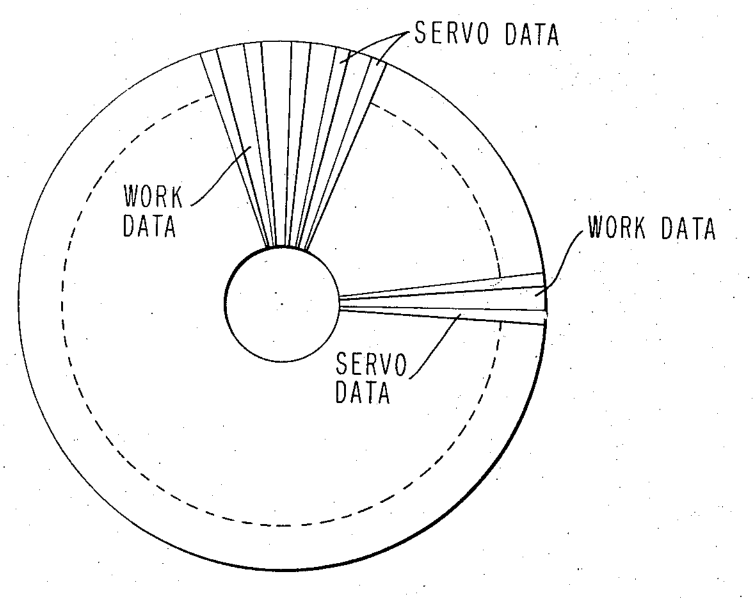
FIG. 5 is an illustration of a disk in which servo data is interspersed with work data.

FIG. 5 shows another arrangement of servo data where the servo signals are interspersed with the work data on all of the disk surfaces. In this arrangement, the track following servo would not continually keep the data head in registration with the data track but would be periodically adjust its position. One of the serious problems with interspersing servo data with work data is that when seeking a target track, the head may pass over a track without observing any servo information and thus not record that it had crossed over a track.

DESCRIPTION OF AN EMBODIMENT

Figures 6A, 6B, 6C, 6D, 6E, 6F, 6G, 6H, 6J:
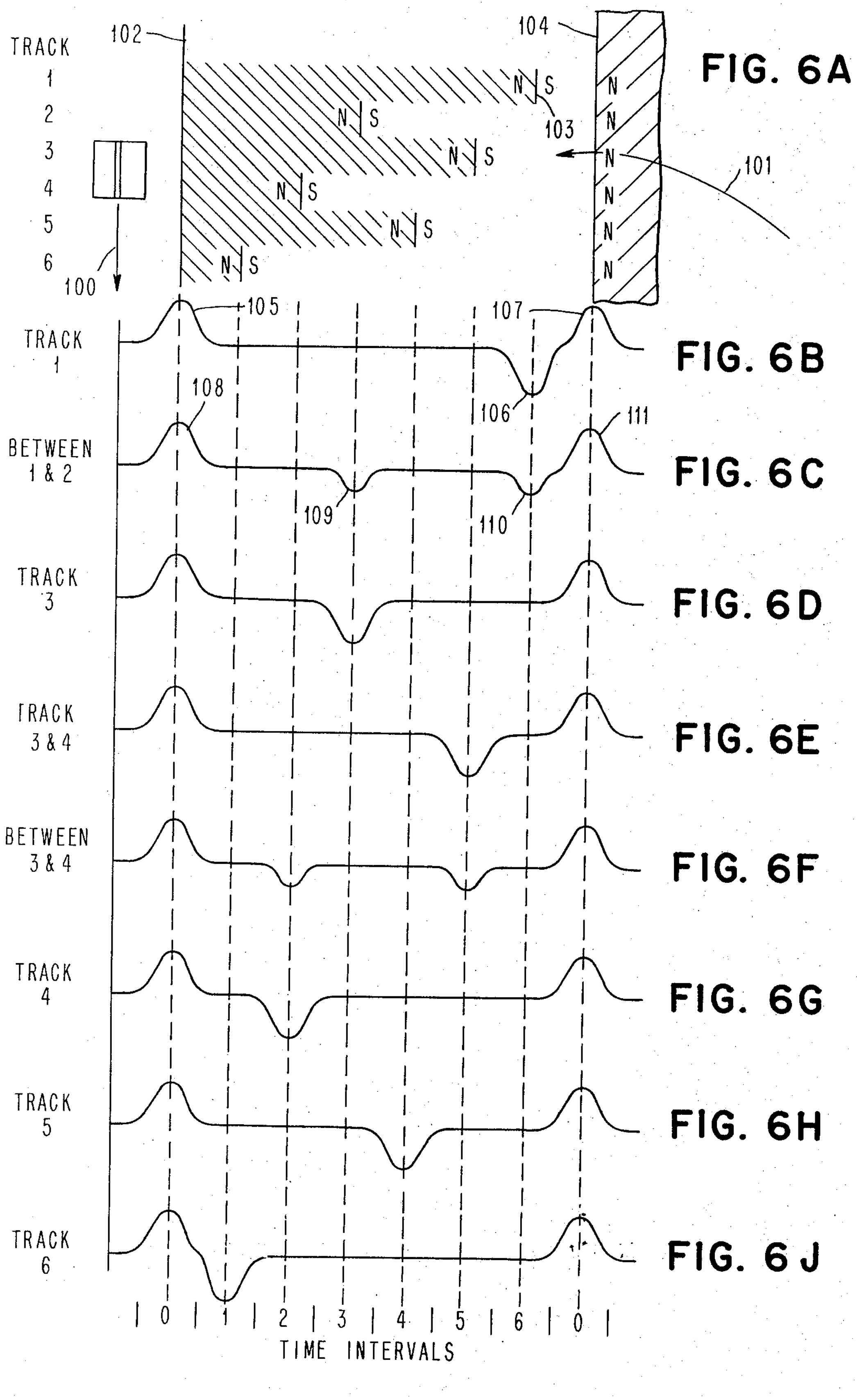
FIG. 6 shows a special magnetization servo data pattern for use with this invention together with charts of detected signals for various positions of the transducing head within a group of tracks.

FIG. 6A shows a pattern of recorded servo signals on the disk surface in accordance with an embodiment of this invention. In the particular pattern shown, a servo head 14 is illustrated as positioned between tracks 3 and 4 on the disk surface. The directional arrow 100 indicated an example direction in which the servo head is moving during a seek operation. Directional arrow 101 indicates the direction in which the disk itself is rotating. The magnetization pattern shown in FIG. 6A illustrates the portion of each servo track polarized according to north polarity and the portion of each servo track polarized according to south polarity. Thus, whenever the servo head 14 senses the transition from north to south (or from south to north), a pulse is sent to the servo circuits.

The charts shown in FIG. 6B through 6J illustrate the pulse pattern which is picked up by the magnetic head 14 whenever the magnetic head is stationary over the track illustrated. Thus, in FIG. 6B, the pulse pattern is produced when magnetic head 14 is in exact registration with servo track 1. FIG. 6B shows that a positive pulse 105 (south to north transition) is developed during time interval 0 along transitional radial line 102. A negative pulse 106 of similar magnitude is generated in time interval 6 along transitional radial line 103 and a second positive pulse 107 is generated in a second time interval 0 along transitional radial line 104.

FIG. 6C illustrates the signal pattern that is picked up by magnetic head 14 when it is positioned half-way between servo tracks 1 and 2 throughout the time intervals. A positive pulse 108 of maximum amplitude is shown picked up in time interval 0 and a negative pulse 109 of one-half amplitude is picked up from servo track 2 in the third time interval. Another negative pulse 110 of one-half amplitude is read from track 1 in the sixth time interval and the maximum positive pulse 111 is once again present in the seond interval 0. Thus, a signal pattern has been provided in which the two negative signals, if in balance, indicate exact positioning of the magnetic head 14 over tracks 1 and 2. Should the magnetic head be slightly more on track 1 than on track 2, the pulse 110 in interval six would be larger than the pulse 106 in interval three. The magnitude of the difference would show the amount by which the head is off center and the interval presence of the two pulses, that is, interval 3 and interval 6, identifies the head as being partially between tracks 1 and 2.

If the head is partially between tracks 2 and 3, negative pulses will occur in intervals 3 and 5. If the head is partially between tracks 3 and 4, negative pulses will occur in intervals 2 and 5; between tracks 4 and 5, negative pulses will occur in intervals 2 and 4 and if the head is directly over track 6, a negative pulse will occur only in interval 1. Thus, a magnetization pattern has been provided which provides the signals for a balancing operation necessary to track following servo mechanisms and also provides information for identifying which track in a group of six tracks over which the head is positioned. Thus, a mechanism is provided for identifying a track within a group of tracks and since a maximum positive pulse occurs during time interval 0, a reference pulse is provided through which tracks may be counted in groups of six. A group of six tracks has been chosen in order to illustrate the invention but actually the magnetization pattern could be extended over any number of selected tracks as has already been pointed out in the Mueller patent referenced above.

Figure 7:
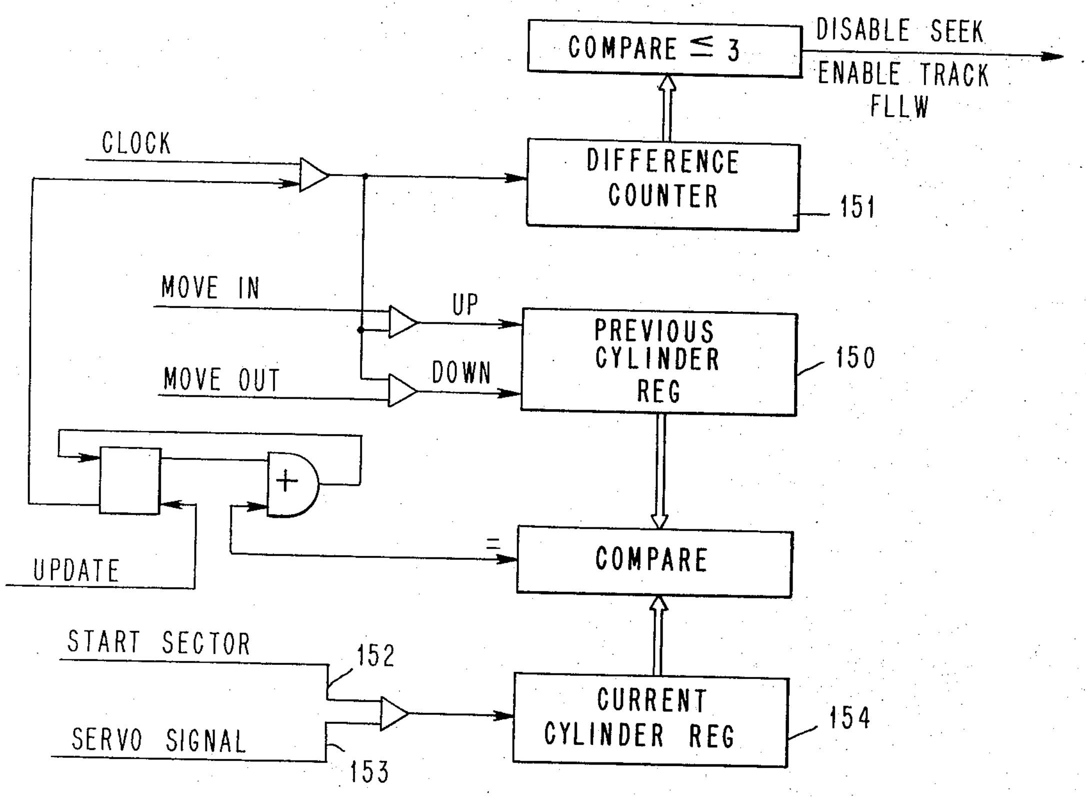
FIG. 7 is a logic circuit for use during the seek operation.
Figures 9, 10:
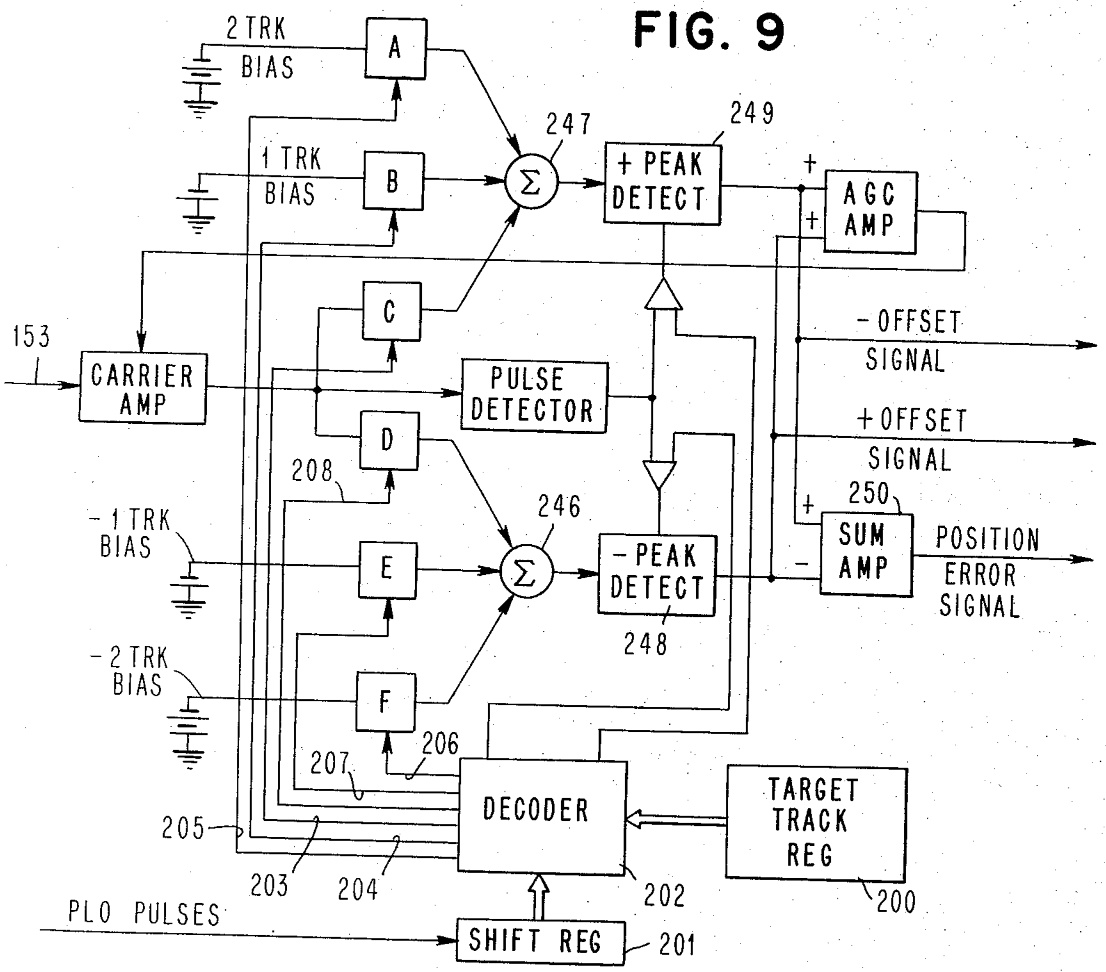
FIG. 9 is a schematic diagram of the track following circuit for use in providing the position error signal of FIG. 8.
FIG. 10 is a chart of typical decoder outputs for the circuit of FIG. 9.

FIG. 7 shows a circuit for use during a seek operation to enable the machine to keep track of the number of track (cylinder) crossings. A starting track (cylinder) number is loaded into the previous cylinder register 150 which, in order to illustrate, may be cylinder 100. If the target cylinder is cylinder 300, then the number 200 is placed in the difference counter 151 and the seek mechanism is signalled to begin its move. The various counters and registers in FIG. 7 will not be updated until the magnetic head 14 moves into the next group which, for consistence in illustration, is set at six tracks. During time interval 0, a reference pulse is sensed as shown on FIG. 6 to raise the start sector line 152. However, in FIG. 6, note that head 14 may sweep into the disk magnetization pattern without crossing the radial signal line 102; that is, it may enter the pattern between radial lines 102 and 104. Hence, the signal indicating the start of a six group sector must be simulated at an appropriate time interval (each interval 0) and the start sector line 152 raised accordingly. Thus, a phase locked oscillator provides the start sector signal and raises line 152. Suppose that the first servo signal observed by magnetic head 14 after the first start sector signal is the signal from track 2 (interval 3). Since the starting track (cylinder) belonged to group 16 track 4 (cylinder 100), the information from the disk magnetization pattern provides us with the knowledge we are now on track 2 of group 17 which is decoded as track 104. That number is placed in the current cylinder register 154 and the update line is raised enabling the clock to update the difference counter 151 and the previous cylinder register 150. The contents of register 150 are compared to register 154 and when equal, the update signal is removed. When the difference counter 151 has been counted down to within three tracks of the target track, the seek circuit is disabled and the track following circuit shown in FIG. 9 is enabled. The number 3 tracks is for a disk magnetization pattern as shown in FIG. 6A where the tracks are divided into groups of six but could be any value depending on the pattern chosen.

Care must be taken in providing input to FIG. 7 so that carriage speed never becomes so great that the servo head passes through more than the group number of tracks without receiving a signal. Thus, the minimum number of servo sectors (S) as shown on FIG. 5 is determined by $$S = (T\sqrt{772\ sg})/[w(n-1)]$$

where $T$ = rotation time, $s$ = half stroke length in radial direction, $g$ = actuator force, $n$ = the number of tracks in the subgroup, and $w$ = the track width.

FIG. 9 provides a track following servo circuit in accordance with this invention. A position error signal is supplied at the output of the circuit from the summing amplifier 250 and the input servo signal is supplied from the head at 153. Suppose that the target is to position the servo head midway between servo tracks 3 and 4 which means that, in proper position, the position error signal is 0 and the two servo inputs at 153 are equal in magnitude. With reference to FIG. 6F, note that the two inputs are a pulse which is received from track 4 in time interval 2 and a pulse which is received in time interval 5 from track 3.

Figure 8:
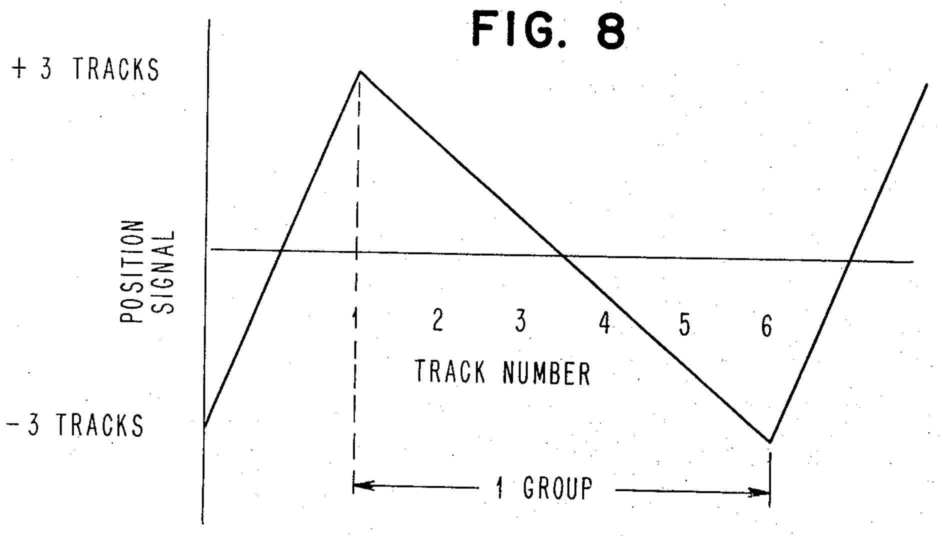
FIG. 8 demonstrates the linear position error signal which is provided in the described embodiment.

The circuit shown in FIG. 9 provides a position error signal which is linear over six tracks, three in one direction from the target track and three tracks in the other direction as shown in FIG. 8. This linear signal is provided by appropriately supplying biasing voltages to the peak detectors 248 and 249 through switches A, B, C, D, E and F. These switches are normally open and are closed according to the position of the magnetic head in relation to the target track as decoded by decoder 202. Target track input to the decoder is from the address register 200 while the time interval input in which the decoder is operating is from the phase locked oscillator through shift register 201. The operation of the decoder is most easily explained through reference to FIG. 10.

First however, note in FIG. 9 that where the target is between tracks 3 and 4, input from the target track register 200 should set up the decoder to raise line 203 and gate C during interval 5 and to raise line 208 and gate D during interval 2. Thus, the signal from track 3 incoming over line 153 is routed through gate C during interval 5 to the summing circuit 247. If the maximum amplitude of that signal is 5 volts, for example, 5 volts is peak detected at 249 and sent to the summing amplifier 250. Similarly, line 208 and gate D are raised during time interval 2 so that the servo signal from track 4 occurring on line 153 is routed through gate D to the summing circuit 246, peak detected at 248 and sent to the summing amplifier 250. If the latter signal is also 5 volts, the position error signal is 0 indicating the head is on the target track.

With reference now to FIG. 10, suppose that the servo signal occurred during time interval 6 indicating that the head was over track 1. The chart on FIG. 10 shows that the target track register has set up the decoder such that in time interval 6, gates A and C are activated together with peak detector 249. With gate A activated, a two track bias signal which may be, for example, 10 volts, is passed through gate A to the summing circuit 247 while the detected signal is passed through gate C. If the detected signal is also 10 volts, that is, the head is directly over track 1, then the summing circuit will put out 20 volts into the peak detector 249. Since there is no output from peak detector 248, the summing amplifier will provide a strong position error signal to move the head toward the target track.

Suppose now that the head is between tracks 1 and 2 and picks up signals from both of those tracks. With respect to the signal from time interval 6, the decoder output is the same as just described but the detected signal will no longer be 10 volts. If, for example, the head is midway between tracks 1 and 2, it will be 5 volts. Thus, the biasing 10 volts is passed through gate A and the detected 5 volts through gate C to summing circuit 247. The peak detector 249 will now sense 15 volts during interval 5. During time interval 3 the signal from track 2 is detected activating gates B and C. Gate B supplies a one track bias which, in our illustration, is 5 volts and that is summed in circuit 247 with the detected signal which, if we are midway between the two tracks, is also 5 volts. Thus, the input to the peak detector 249 during interval 3 is 10 volts. Since 10 volts (interval 3 ) is less than 15 volts (interval 5), the peak detected voltage is 15 volts to move the head toward the target track. In this manner, the value of the position error signal is reduced from the 20 volts above to 15 volts as the head approaches the target track. The circuit thus provides a linear position error signal directly proportional to the distance of the head from the target track so that the head is driven toward the target track.

A second example of decoder output is shown in FIG. 10 for the situation in which the target track calls for positioning the servo head between tracks 1 and 2. Since the rationale for this situation is the same as that just discussed, no further explanation is needed.

Thus a circuit has been provided for extending the range of the position error signal beyond the plus or minus one-half track found in the prior art. Note also that this circuit can be used for offsetting the servo head by providing a positive or negative offset signal to modify the bias as shown on FIG. 9. Since the range of the circuit is linear over plus or minus three tracks in the example shown, the offset signal may be such that the position error signal can be reduced to zero as much as three tracks removed from the target.

It should also be noted that while the invention has been described through the illustration of a flux magnetization transition pattern, any appropriate track distinguishing mechanism may be used. Thus, for example, a six track group may be distinguished by providing six different frequencies or six different phase relationships.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a servo system for positioning transducing heads to transmit work data from and to one of a plurality of data bearing tracks and to read servo data from said tracks, a servo system comprising:

seeking means for rapidly moving a selected transducing head from a present location toward a target data track, means for transferring control from said seeking means to track following means when said selected transducing head has approached to within a selected definite number of tracks more than one-half track from said target track, and track following means for homing said selected transducing head on said target track within said selected definite number of tracks and thereafter maintaining said head in accurate registration with said target track, said track following means including biasing means and summing means connected by gating means to provide a sum of a signal from said biasing means with a signal from said selected transducing head to provide a position error signal of linear slope over said selected definite number of tracks.

2. The system of claim 1 wherein said servo data is on separate tracks from said work data.

3. The system of claim 1 wherein said servo data is interspersed with said work data on the same tracks, wherein means recorded in said servo data identify tracks within a repeating group of tracks, wherein said seeking means includes means to count the group number so that said group number and a track number within said group identifies the specific track over which said selected transducing head is situated at least once in each group of tracks, and means to produce a reference signal when said head enters each successive group of tracks.

4. The system of claim 1 in which means are provided to modify said position error signal in accordance with an offsetting signal so that said head can be caused to follow a track offset from said target track within plus or minus one-half said selected definite number of tracks.

5. The system of claim 1 wherein said track following means further includes a decoder for supplying successive signals to said gating means, said gating means operated in a sequence determined by said successive signals from said decoder for passing servo signals from said selected transducing head to said summing means when said servo signal and a signal from said decoder are both present at said gating means.

6. In a servo system for positioning transducing heads to transmit work data from and to one of a plurality of data bearing tracks and to read servo data from said tracks, seeking means to move a head from a present position toward a target track comprising means recorded in said servo data to identify tracks within a repeating group of tracks, means to count the group number so that said group number and a track number within said group identifies the specific track over which said head is situated at least once in each group of tracks, and an oscillator means to produce a reference signal for said counting means when said head enters each successive group of tracks.

* * * * *